United States Patent

Pommer, II

[11] Patent Number: 4,532,382
[45] Date of Patent: Jul. 30, 1985

[54] POWER SUPPLY FOR TELEPHONE EQUIPMENT MEMORY DEVICES

[75] Inventor: Karl E. Pommer, II, Los Alamos, N. Mex.

[73] Assignee: GTE Automatic Electric Incorporated, Northlake, Ill.

[21] Appl. No.: 575,369

[22] Filed: Jan. 30, 1984

[51] Int. Cl.³ .................. H04M 1/00; H04M 1/274
[52] U.S. Cl. ............................... 179/81 R; 179/90 B
[58] Field of Search ............ 179/77, 70, 2 BC, 90 B, 179/90 BD, 16 AA, 16 F, 170 J, 81 R

[56] References Cited

U.S. PATENT DOCUMENTS 4,197,425  4/1980  Secrett et al. ............... 179/81 R X Primary Examiner—Gene Z. Rubinson
Assistant Examiner—James L. Dwyer
Attorney, Agent, or Firm—Robert J. Black; Gregory G. Hendricks

[57] ABSTRACT

A power supply circuit for use in a subscriber's telephone that incorporates memory devices for use in repertory dialing, last number recall, and similar functions. This circuit interfaces with the telephone line to provide the data retention supply current needs of volatile static memory devices. It also interfaces with the power supply of the associated logic circuitry to supply the needed operating voltage.

10 Claims, 4 Drawing Figures

POWER SUPPLY FOR TELEPHONE EQUIPMENT MEMORY DEVICES

BACKGROUND OF THE INVENTION

1. Technical Field

The present invention pertains to power supplies, and more particularly, to a power supply for use with a subscriber's telephone instrument that includes one or more memory devices which need a continuous current source so as to maintain data stored within the memories.

2. Background Art

The concept of utilizing the telephone line, as connected to a central switching point, as a power source to both maintain (while in the on-hook position) and manipulate (while in the off-hook position) the data contents of a memory device has been implemented in telephones equipped with pulse dialers including the so-called redial feature, such as implemented in the Flip Phone ® II manufactured by GTE Business Communications Systems Incorporated.

Referring to FIG. 1 of the prior art as shown, a resistance in excess of ten megohms consisting of resistors R1 and R2 is connected between the output of the diode bridge polarity guard B1 which interfaces to the telephone line and the power supply input (V+) to the pulse dialer IC-1. Connected in parallel with the pulse dialer IC-1 is a small storage capacitor C1 which is present to maintain the data contents stored in the pulse dialers memory circuitry, during momentary interruptions in the DC voltage across the telephone line which is connected to those conductors designated tip and ring. Prior to the so-called avalanche breakdown of the integrated circuit IC-1, which nominally occurs at about 12 volts, the idle load presented by the integrated circuit IC-1 approximates that of a one megohm resistor. Given an on-hook line voltage of 50 volts DC, these two resistances form a voltage divider preventing any loss of memory due to avalanche breakdown. Since the associated logic circuitry, included in the integrated circuit IC-1, is designed to share the same power supply, no conflict exists between the signal interface of the memory and logic circuitry. A constant current is supplied to operate the integrated circuit IC-1 in the off-hook mode.

In a number of the telephones currently available which include a number of different features as well as a repertory dialer, such as, the "Execuphone," manufactured by TIE Incorporated, and the "Duophone 160," marketed by Radio Shack Incorporated, which utilize a CMOS microprocessor; a random access memory (RAM) and dual tone multifrequency tone dialer, both implemented as integrated circuits, perform the necessary control functions. Generally, these integrated circuit units are powered by a five volt battery supply derived from either the AC power line, the telephone line, or a backup internally-included battery. Data retention by the CMOS random access memory is maintained in the on-hook condition by either the AC power line or the backup battery.

Some subscribers' telephones which incorporate a multitude of features, including that of repertory dialing, such as that manufactured by American Telecommunications Corporation under the name "Hangtel," may also be completely powered by the telephone line. The circuit shown in prior art FIG. 2 is somewhat similar to the pulse dialer circuit of prior art FIG. 1. However, in FIG. 2 the random access memory quiescent or memory retention current represents a leakage current effect rather than that of a resistive load. A 5.6 volt zener diode CR3 is utilized as a clamp, which prevents the random access memory IC-2 from entering avalanche breakdown. Typically, the zener diode clamps the random access memory's IC-2 supply voltage to 4.9 volts given an idle telephone line voltage of 50 volts. Since the voltage supply for the microprocessor IC-3 is set by 5.1 volt zener diode CR6, the S1 input to the microprocessor will not experience any ill-effects due to a high level voltage from the random access memory IC-2's DO output Such an event, however, could change the internal logic states of the microprocessor. Without such compatibility between the on-hook voltage supply for the random access memory and the off-hook voltage supply for the microprocessor, the storage capacitor C2 would prolong any excess voltage transient appearing at the input to the microprocessor. This could only further degrade the integrity of the microprocessor IC-3.

The principal disadvantage of the prior art circuit of FIG. 2 is that the clamping zener supplied to the random access memory must exhibit a sharp breakdown knee in its current versus voltage characteristics. Otherwise, the clamping zener would drain the current needed by the random access memory to maintain greater than the minimum data retention supply voltage. Such a requirement forces the microprocessor to operate with a voltage supply in the neighborhood of 5 volts. Unfortunately, telephones connected to long subscriber loops may not be able to supply this voltage level from the telephone line. It should be noted that Electronic Industry Association (EIA) specification RS-470 specifies that the input voltage to the telephone must not exceed 6 volts given a loop current of 20 milliamps in the off-hook state.

Accordingly, it is the object of the present invention to provide a power supply for use with a subscriber's telephone, which includes a repertory dialer, which may be completely powered from the telephone subscriber's line. The design of the power supply is such as to overcome the objections to prior art power supplies, while being compatible with both the on and off-hook states of the subscriber's telephone set.

SUMMARY OF THE INVENTION

The present invention consists of a power supply for use with an electronic subscriber's telephone instrument. The power supply is connected via a polarity guard to the tip and ring conductors of a telephone line which normally extends to a telephone central office or similar switching point. Included in the subscriber's telephone circuit for the power supply is a capacitor utilized for energy storage. Also included is a diode used to couple power from the present low voltage supply for controlling logic circuitry to a memory device. A resistor is used to decouple the capacitor noted above from the diode utilized for coupling to the control logic. Also included in the power supply of the present invention is a resistor coupled to the telephone line and a voltage limiting means, a voltage divider used to couple the limiting means to another diode which is also coupled to the capacitor means noted above. A transistor voltage follower may be employed in place of the diode, coupled to the voltage divider means.

The arrangement disclosed in the present invention allows the memory device included in a repertory dialer found in a subscriber's telephone set, to obtain power from the telephone subscriber line while in the on-hook state, for the maintenance of volatile data for prolonged periods of time. When the low voltage supply for the controlling logic circuitry is enabled, it provides a means to supply some of the power to the memory device. This voltage must be sufficiently low so that it may be directly obtained from the telephone line in the off-hook state of the telephone set. It also contains a capacitor sufficient in size to enable it to independently power the memory device for periods up to several minutes.

DESCRIPTION OF THE PREFERRED EMBODIMENT

Figure 3:
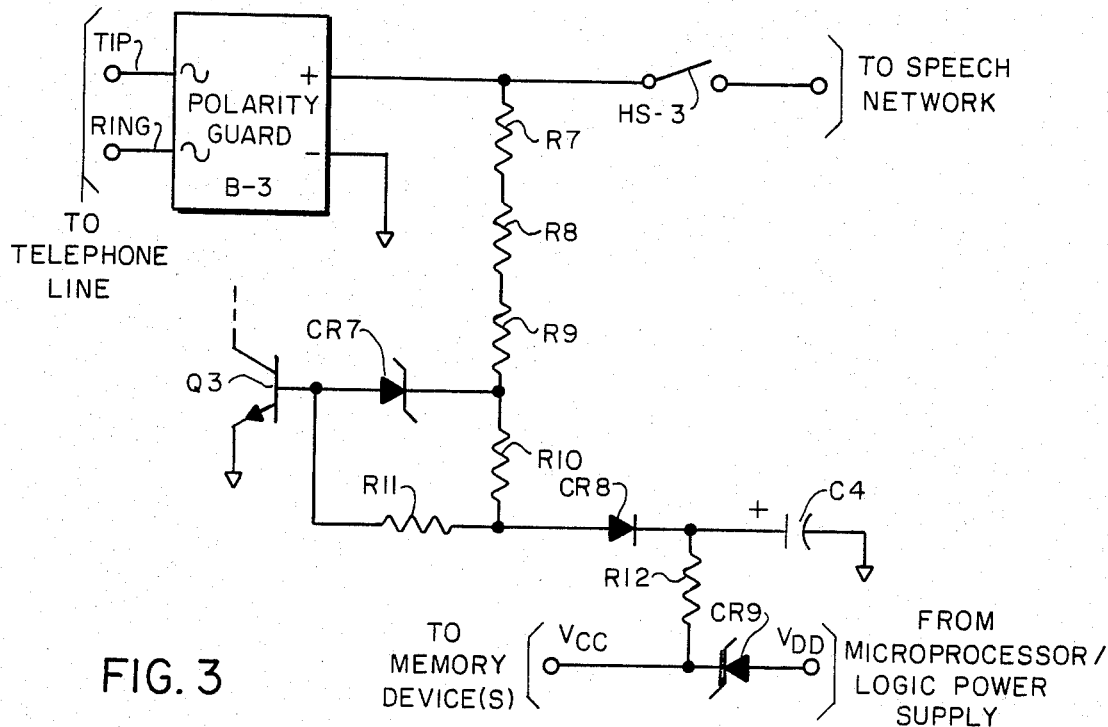
FIG. 3 is a combination schematic and block diagram of a power supply for use with a subscriber's telephone equipped with a memory in accordance with the present invention.
Figure 4:
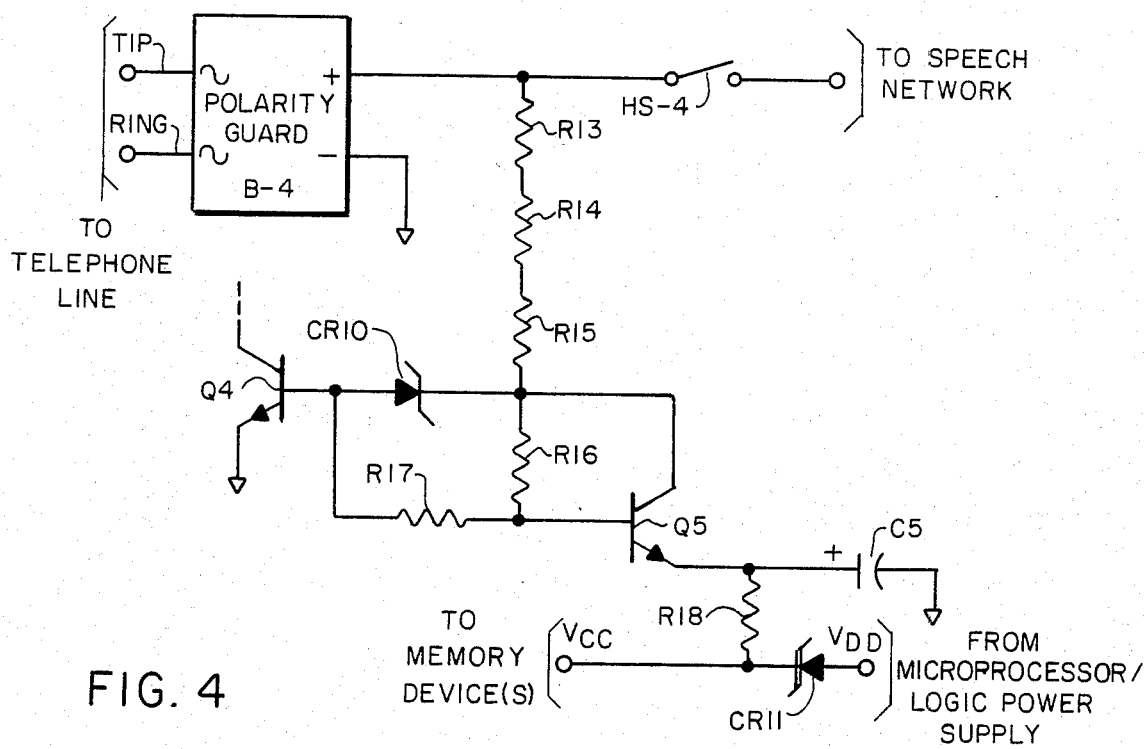
FIG. 4 is a simplified schematic and block diagram of a power supply for use with a subscriber's telephone circuit equipped with a memory device and also in accordance with the present invention.

Referring now to FIGS. 3 and 4, two telephone power supply circuits for subscribers' telephones equipped with memory devices are shown. These units are of a design to meet certain established criteria including the following: the operating voltage for the memory device shall be sufficiently low that it may be derived from the telephone line in the off-hook state of the telephone. This voltage is typically 3.1 volts DC. The operating voltage supplied to the memory device must closely follow or track that supplied to included logic devices during normal operation and during initial turn-on conditions. These two supply voltages are coupled to the input/output lines interconnecting the memory device and the associated microprocessor and/or logic devices. The input voltages must be maintained within limits to prevent any degradation to the logic states of these devices. For CMOS devices this means that the input voltages to a given device must be less than the supply voltage plus 0.3 volts. In the on-hook state of the telephone, power must be derived from the telephone line to either maintain or help maintain the data contents of the memory device. For CMOS random access memories, this means that the supply voltage must equal or exceed 2 volts DC.

Figure 1:
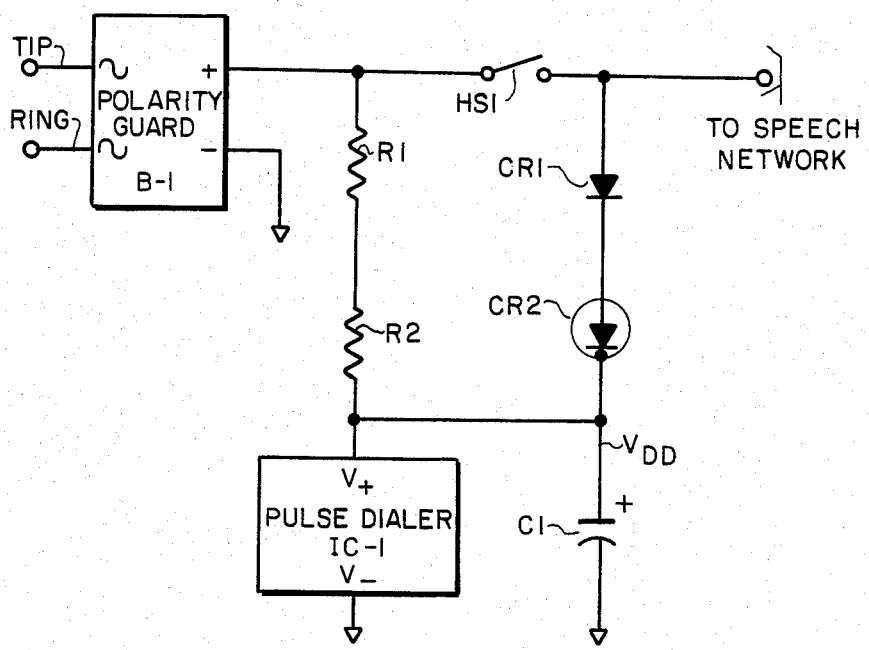
FIG. 1 is a combination schematic and block diagram of a prior art power supply for use with a memory equipped subscriber's telephone.
Figure 2:
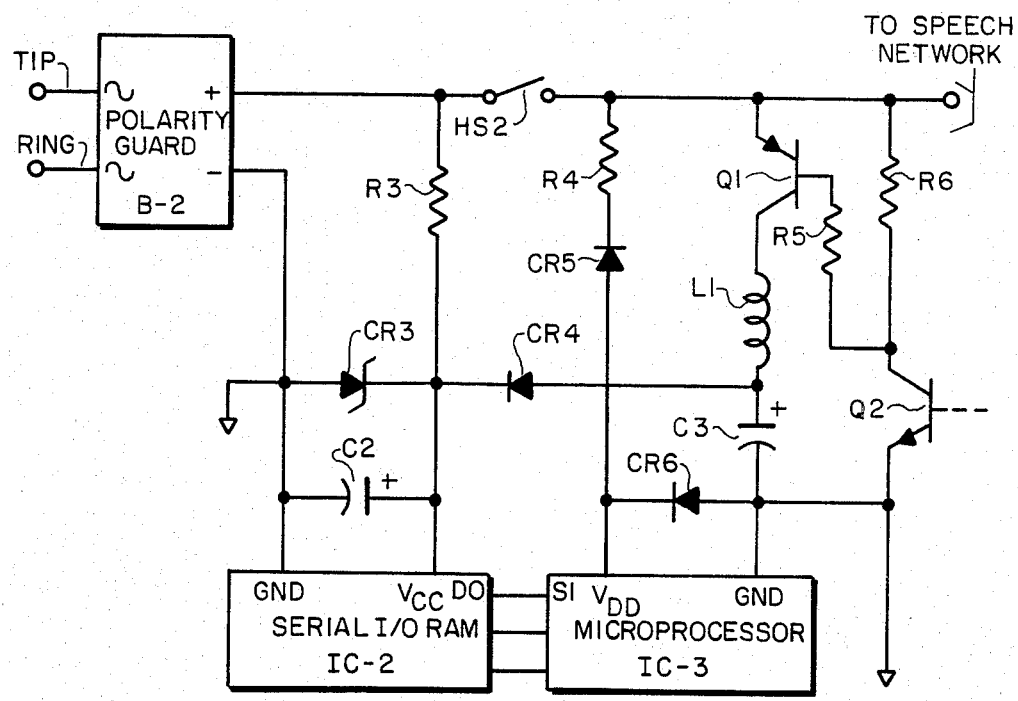
FIG. 2 is a combination schematic and block diagram of another prior art power supply circuit for use with a subscriber's telephone equipped with memory circuit.

Additional requirements include the necessity for the turn-on response time of the voltage supply to the microprocessor and/or logic circuitry not to be significantly altered by the design of the voltage supply for the memory devices. When sufficient power is not available from either the microprocessor/logic device voltage supply or the telephone line, the power supply for the memory devices must be capable of independently maintaining the volatile data in memory for short periods of time. This may be defined by the needed time to replace a battery while the telephone is disconnected from both the telephone line and the AC power line. Circuitry shown in FIGS. 3 and 4 meet these criteria, while those shown in prior art FIGS. 1 and 2 do not. The common power supply circuit of FIG. 1 of the prior art maintains a fast turn-on response (typically, 117 milliseconds) by limiting the data retention guaranty to about 2 seconds. Both parameters are dependent on the value of the storage capacitor included. The dual power supply concept of FIG. 2 is not applicable to low voltage operations since the zener diode limiting the random access memory's voltage supply would not exhibit a sharp breakdown characteristic. As a result, it would seriously degrade the ability of this circuit to supply the minimum voltage needed to maintain the data contents of memory. The zener diode would absorb most of the energy which could be derived in the on-hook mode from either the storage capacitor or the telephone line. Furthermore, a large value storage capacitor would degrade the ability of the memory power supply to track the microprocessor supply given the voltage of the memory supply is greater than the voltage of the logic supply initially.

Low voltage operation of a memory device included in the subscriber's telephone, based on the circuit shown in FIG. 3, is facilitated by the combination of a Schottky diode CR9, series dropping resistor R12, and storage capacitor C4. Resistor R12 is used to decouple input diode CR9 from the loading effects of the storage capacitor C4. As a result, the value of capacitor C4 and the associated memory data retention hold time can be greatly increased without significantly increasing the turn-on response time of the microprocessor/logic circuitry power supply. Diode CR9 has the function of disconnecting the microprocessor/logic power supply input at terminal $V_{DD}$ from the memory device when it can no longer act as a source of power. Utilization of a Schottky diode for diode CR9 serves two purposes. First, it permits an even lower, typically 0.4 volts DC supply voltage to power the memory devices (at terminal $V_{CC}$) and in addition the low AC impedance and fast response time exhibited by a Schottky diode permits the absence of a decoupling capacitor across the memory voltage supplied.

The memory device, included in the typical subscriber's telephone arrangement, (not shown but connected at terminal $V_{CC}$) enters the standby or data retention mode when its operation is not specifically selected via the associated microprocessor or logic circuitry. The necessary data retention supply voltage and current may be derived from the microprocessor/logic voltage supply, storage capacitor C4 or the telephone line. When feasible, capacitor C4 stores the charge derived either from the microprocessor/logic voltage supply or from the telephone line.

The maximum power which may be derived from the telephone line in the on-hook state is limited by the DC ringer equivalence of the telephone. Specifically, it defines the maximum input leakage current to the telephone with 100 volts DC applied between tip and ring terminals. This requirement is guaranteed in the circuitry of FIG. 3 by the limiting resistance due to resistors R7 through R9. The voltage limiter composed of zener diode CR7 and the base emitter diode of optional transistor Q3 is used to prevent a charge storage capacitor from exceeding the safe limit of the memory device power supply voltage. Recalling the input/output considerations, this limit is established at the voltage ($V_{DD}$) of the microprocessor/logic supply plus 0.3 volts for CMOS devices. A voltage divider composed of resistors R10 and R11 is coupled across diode CR7 in order to allow the zener diode to operate in the avalanche breakdown mode. As a result, the zener diode exhibits a very sharp breakdown characteristic of a voltage significantly greater than the voltage supply ($V_{DD}$) of the microprocessor/logic circuitry. The current through resistors R12 and R11 may be optionally used to turn on transistor Q3. The output of the voltage divider is coupled to storage capacitor C4 via the diode action of diode CR8. Like diode CR9, diode CR8 prevents the storage capacitor from being discharged when the voltage on the telephone line is inadequate.

The alternate circuit of FIG. 4 includes the addition of a voltage follower transistor Q5, to the output of the voltage divider. The base emitter diode of transistor Q5 performs the same function as diode CR8. The use of this circuit permits a significant increase in the data retention supply current. Given a minimum input voltage of 42.5 volts DC, the maximum data retention supply current (when the output of the power supply to the memory circuitry (at terminal $V_{CC}$) is equal to 2 volts DC) causes current to increase from 0.5 microamps to about 2 microamps.

While only two embodiments of the present invention have been shown, it will be obvious to those skilled in the art the numerous other modifications may be made without departing from the spirit and scope of the present invention which shall be limited only by the scope of the claims appended hereto.

What is claimed is:

1. In combination, a substation telephone including connections via a telephone line, to a source of battery located at a central switching point, said telephone including a low voltage power supply, at least one memory device and a power supply for said memory device comprising:
    a first input including voltage dropping means and voltage limiting means connected in series across said telephone line and voltage dividing means connected across a portion of said voltage limiting means to derive a voltage from said battery source located at said central switching point;
    energy storage means;
    first unidirectional conducting means connecting said voltage limiting means to said energy storage means;
    a second input including second unidirectional conducting means connecting said low voltage supply to said memory device power supply output; and
    a decoupling means connected between said energy storage means and said second unidirectional conducting means also providing a circuit connection from said first unidirectional conducting means to said memory device power supply output, whereby voltage for operation of said memory device may be derived from said telephone line, from said low voltage power supply, or from voltage stored in said energy storage means.

2. The combination, as claimed in claim 1, wherein: said voltage dropping means of said first input comprises a plurality of serially connected resistors including a circuit connection to said telephone line.

3. The combination, as claimed in claim 1, wherein: said voltage limiting means comprise a zener diode and a first transistor serially connected to said resistors and to said telephone line.

4. The combination, as claimed in claim 3, wherein: said voltage dividing means comprise a pair of resistors serially connected across said zener diode.

5. The combination, as claimed in claim 1, wherein: said energy storage means comprise a capacitor.

6. The combination, as claimed in claim 1, wherein: said second unidirectional conducting means connecting said low voltage supply to said memory device comprises a Schottky diode 7. The combination, as claimed in claim 6, wherein: said decoupling means comprise a resistor connected between said Schottky diode and said capacitor and including a circuit connection to said memory power supply output.

8. The combination, as claimed in claim 1, wherein: said first unidirectional connecting means connecting said voltage limiting means to said energy storage means further includes circuit connections to said power supply output via said decoupling means.

9. The combination, as claimed in claim 8, wherein: said first unidirectional connecting means comprises a diode.

10. The combination, as claimed in claim 8, wherein: said first unidirectional connecting means comprises the base-emitter diode of a transistor.

* * * * *